United States Patent [19]
Shoji et al.

[11] Patent Number: 5,905,124
[45] Date of Patent: May 18, 1999

[54] METHODS FOR PRODUCING 2-HYDROXYETHYL METHACRYLATE POLYMER, HYDROGEL AND WATER-CONTAINING SOFT CONTACT LENS

[75] Inventors: Noriyuki Shoji; Masashi Nomura; Yuichi Yokoyama, all of Tokyo, Japan

[73] Assignee: Hoya Corporation, Tokyo, Japan

[21] Appl. No.: 08/837,888

[22] Filed: Apr. 22, 1997

[51] Int. Cl.$^6$ ...................................................... C08F 4/06
[52] U.S. Cl. ............................................ 526/135; 523/106
[58] Field of Search ............................... 523/106; 526/135

[56] References Cited

U.S. PATENT DOCUMENTS

| | | | |
|---|---|---|---|
| 3,941,858 | 3/1976 | Shepherd et al. | 260/885 |
| 4,801,740 | 1/1989 | Hammar | 560/224 |

FOREIGN PATENT DOCUMENTS

| | | |
|---|---|---|
| 0 433 085 | 12/1990 | European Pat. Off. . |
| 47-3735 | 2/1972 | Japan . |
| A-4-110311 | 4/1992 | Japan . |
| A-4-335007 | 11/1992 | Japan . |

*Primary Examiner*—Kriellion S. Morgan
*Attorney, Agent, or Firm*—Griffin, Butler, Whisenhunt & Szipl, LLP

[57] ABSTRACT

A method for producing 2-hydroxyethyl methacrylate polymers comprising polymerizing 2-hydroxyethyl methacrylate or a monomer mixture thereof containing a halogen compound thorough radical polymerization; method for producing hydrogels comprising subjecting the polymers to a water-imparting treatment; method for producing water-containing soft contact lenses comprising molding the polymers into a shape of contact lens and subjecting them to a water-imparting treatment and method for producing polymers comprising treating at least molding surfaces of molds, which form a cavity of contact lens shape, with a halogen compound and polymerizing 2-hydroxyethyl methacrylate or a monomer mixture thereof in the cavity through radical polymerization are disclosed. According to the present invention, water-containing soft contact lenses with high heat resistance and intermediates therefor are obtained from 2-hydroxyethyl methacrylate of high purity.

59 Claims, 2 Drawing Sheets

METHODS FOR PRODUCING 2-HYDROXYETHYL METHACRYLATE POLYMER, HYDROGEL AND WATER-CONTAINING SOFT CONTACT LENS

BACKGROUND OF THE INVENTION

1. Field of the Invention

The present invention relates to methods for producing a 2-hydroxyethyl methacrylate polymer, a 2-hydroxyethyl methacrylate hydrogel and a 2-hydroxyethyl methacrylate water-containing soft contact lens, which exhibit improved heat resistance and transparency.

2. Related Art

Hydrogels are used as medical materials, in particular, as a material for water-containing soft contact lenses.

Because hydrogels contain water, microorganisms are likely to propagate in medical devices made of hydrogels. Therefore, such products are usually sterilized by pressurization and heating, i.e., by autoclaving before their shipment. These products also must be sterilized upon use. Heat disinfection and chemical disinfection are usually used, and heat disinfection is more effective and hence used more commonly. Therefore, hydrogels used for medical devices such as water-containing soft contact lenses should exhibit high durability against sterilization and disinfection by heating.

As hydrogels for medical devices, those mainly composed of 2-hydroxyethyl methacrylate (abbreviated as HEMA hereinafter) are widely used (see Japanese Patent Publication No. Sho 41-12629 (JP-B-12629/66) and Japanese Patent Publication No. Sho 47-3735 (JP-B-3735/72)).

HEMA mentioned above was originally supplied as a monomer mixture containing methacrylic acid, ethylene glycol dimethacrylate, alkylene glycol monomethacrylate or dimethacrylates and the like as impurities. However, with recent general improvement of the purity of industrial products, HEMA with 3% or less of the above impurities has become commercially available. Further, HEMA of a high purity of 99% or higher is also commercially available at present.

HEMA of such a high purity is useful as feed stock for production of water-containing soft contact lenses by cast polymerization, which requires precise control of polymerization conditions. Water-containing soft contact lenses of stable quality can be obtained by the above cast polymerization.

However, as a result of present inventors' research, it was found that, when sterilization by autoclave and heat sterilization were repeated, surface conditions of water-containing soft contact lenses produced from HEMA of such high purity as mentioned above are degraded, so that they suffer from problems such as light scattering and white clouding when observed on the surface by the naked eye surface observation by naked eye or stereoscopic microscope.

Further, when the transcription of a molding surface is insufficient in cast polymerization which utilizes molds with molding surfaces forming a cavity of a contact lens shape, white clouding may be observed on the surfaces of water-containing contact lenses produced by imparting water into the obtained polymer because of light scattering caused by ununiformity of the surfaces. As a result of the present inventors' research, it was also found that such a phenomena becomes particularly remarkable when the above-mentioned high purity HEMA is used.

As a method for improving heat resistance of the HEMA hydrogel, it is known to copolymerize a crosslinking agent or a hydrophobic component with HEMA (see Japanese Patent Unexamined Publication No. Hei 4-335007 (JP-A-335007/92)). However, HEMA copolymerized with a crosslinking agent or hydrophobic component may disadvantageously exhibit inferior configuration recovery because of increased elastic coefficient, increased brittleness of the hydrogel, decreased water content and the like.

In order to improve the transcription of the molded surface, it is also known to add a solvent or water to monomers containing HEMA upon polymerization so that polymerization shrinkage is decreased (see Japanese Patent Unexamined Publication No. Hei 4-110311 (JP-A-110311/92)). In this method, a diluent replaceable with water such as a boric acid ester of dihydric alcohol is added to a monomer mixture upon direct molding of contact lenses. The use of the diluent enables a decrease in mold opening power and surface defects of the molded articles. However, in such a method, the obtained polymer is a gel containing a solvent or water which is a component of the diluent. This means that a soft and weak gel product should be handled in a process where the gel released from the mold is equilibrated with a solution in which contact lenses are used, e.g., physiological saline. Operability of such a process would be bad and handling of such a gel would be troublesome.

Therefore, an object of the present invention is to provide a water-containing soft contact produced by using HEMA of high purity, which is excellent in heat resistance.

Another object of the present invention is to provide a polymer and hydrogel, which are produced by using HEMA of high purity and can be an intermediate for the above water-containing soft contact lens.

A further object of the present invention is to provide a method for producing water-containing soft contact lenses exhibiting excellent heat resistance and methods for producing polymers and hydrogels which can be an intermediate of the above water-containing soft contact lenses, where HEMA of high purity is used and polymerization conditions can be controlled precisely.

A still further object of the present invention is to provide a method for producing water-containing soft contact lenses exhibiting excellent transparency and heat resistance by cast polymerization, and methods for producing polymers and hydrogels which can be an intermediate of the above water-containing soft contact lenses, where HEMA of high purity is used and polymerization conditions can be controlled precisely.

SUMMARY OF THE INVENTION

The present invention relates to a method for producing 2-hydroxyethyl methacrylate polymers which comprises polymerizing 2-hydroxyethyl methacrylate containing a halogen compound or a monomer mixture mainly composed of 2-hydroxyethyl methacrylate and containing a halogen compound by radical polymerization.

The present invention also relates to a method for producing 2-hydroxyethyl methacrylate polymers wherein a halogen compound is added to 2-hydroxyethyl methacrylate or a monomer mixture mainly composed of 2-hydroxyethyl methacrylate and then radical polymerization is performed.

The present invention also relates to a method for producing 2-hydroxyethyl methacrylate hydrogels wherein a 2-hydroxyethyl methacrylate polymer obtained by the above methods is subjected to a water-imparting treatment.

The present invention further relates to a method for producing water-containing soft contact lenses wherein a 2-hydroxyethyl methacrylate polymer obtained by the above methods is molded into the shape of a contact lens and subjected to a water-imparting treatment.

The present invention still further relates to a method for producing 2-hydroxyethyl methacrylate polymers wherein at least molding surfaces of molds, which surfaces form a cavity of contact lens shape, are treated with a halogen compound or a solution containing a halogen compound and 2-hydroxyethyl methacrylate or a monomer mixture mainly composed of 2-hydroxyethyl methacrylate is polymerized in the cavity by radical polymerization.

The present invention also relates to a method for producing water-containing soft contact lenses wherein a 2-hydroxyethyl methacrylate polymer obtained by the above methods is subjected to a water-imparting treatment.

The present invention further relates to a 2-hydroxyethyl methacrylate polymer, 2-hydroxyethyl methacrylate hydrogel and 2-hydroxyethyl methacrylate water-containing soft contact lens produced by the above methods.

DETAILED DESCRIPTION OF THE INVENTION

Figure 1:
FIG. 1 is a photograph showing a magnified surface of a contact lens undergone 360 times of boiling sterilization by a boiling sterilizer.

The present inventors found that water-containing soft contact lenses obtained by polymerizing 2-hydroxyethyl methacrylate or a monomer mixture mainly composed of 2-hydroxyethyl methacrylate by radical polymerization in the presence of a small amount of a halogen compound and subjecting the obtained polymer to a water-imparting treatment exhibit more excellent heat resistance compared to conventional ones and thus completed the present invention.

The present inventors also found that water-containing soft contact lenses obtained by polymerizing 2-hydroxyethyl methacrylate or a monomer mixture mainly composed of 2-hydroxyethyl methacrylate through cast polymerization in the presence of a small amount of a halogen compound and subjecting the obtained polymer to a water-imparting treatment exhibit transparency comparable to that of conventional ones and more excellent heat resistance compared to them, and thus completed the present invention.

In the production method of the present invention, a halogen compound is used. The halogen compound is not particularly limited so long as it is a compound containing a halogen atom(s). However, in view of affinity with the monomer component, the halogen compound is preferably a halogen-containing organic compound. In particular, hydrocarbon compounds containing 1 to 4 carbon atoms and one or more chlorine or bromine atoms, for example, ethylene chlorohydrin, carbon tetrabromide, carbon tetrachloride, chloroform, dichloromethane, trichloroethane and the like are preferred.

The above halogen compound is added to the monomer component, or, when cast polymerization is performed, polymerization is carried out using a mold whose molding surface is treated with a solution containing the halogen compound. When the halogen compound is added to the monomer component, the amount of the halogen compound is preferably 0.05 to 6% by weight, more preferably 0.1 to 5% by weight of the monomer component. The treatment of molding surface of mold with the halogen compound can be carried out by immersing the mold as a whole into a solution containing the halogen compound or spraying a solution containing the halogen compound on at least the molding surface of the mold or the like. The solution containing the halogen compound may be a solution containing a halogen-containing organic compound diluted with a suitable organic solvent, or an undiluted halogen-containing compound may be used. If desired, a monomer component containing a halogen compound may be polymerized in a mold whose molding surface is treated with a solution containing a halogen compound. In such a case, amounts of the halogen compound added to the monomer component and the halogen compound used for the treatment of the molding surface can be adjusted appropriately.

In the present invention, 2-hydroxyethyl methacrylate of high purity is used as a starting material. For example, it has a purity of 96% or more, preferably 99% or more. 2-Hydroxyethyl methacrylate alone may be polymerized to form a homopolymer, or a monomer mixture mainly composed of 2-hydroxyethyl methacrylate may be used as a starting material for polymerization. Such a monomer mixture should contain 2-hydroxyethyl methacrylate in an amount of 50 mol % or more. However, as the content of 2-hydroxyethyl methacrylate is increased, physical properties of the obtained polymer is more dominated by the physical properties of 2-hydroxyethyl methacrylate. Therefore, if it is desired that physical properties of 2-hydroxyethyl methacrylate should be prominent, the content may be 70 mol % or more, preferably 90 mol % or more.

The other monomer components contained in the monomer mixture mainly composed of 2-hydroxyethyl methacrylate are not particularly limited, and kind and content thereof can be suitably selected depending on properties required for polymers and water-containing soft contact lenses. Examples of the monomers include methyl (meth)acrylate, ethyl (meth)acrylate, n-butyl (meth)acrylate, (meth)acrylic acid, (meth)acrylamide, N,N-dimethyl(meth)acrylamide, 2-hydroxyethyl (meth)acrylate, ethyl vinyl ether, n-butyl vinyl ether, glycerol methacrylate, N-vinylpyrrolidone and the like.

Because the above monomer components are polymerized through radical polymerization, a suitable amount of radical polymerization initiator (e.g., about 0.01 to 4% by weight) is added to the monomer mixture. This kind of radical polymerization initiator is not particularly limited and can be suitably selected depending on the kind of polymerization desired. For example, organic peroxide initiators such as benzoyl peroxide, lauroyl peroxide, cumene hydroperoxide, di-t-butyl peroxide, bis-4-t-butylcyclohexyl peroxydicarbonate, diisopropyl peroxydicarbonate, t-butylperoxy(2-ethylhexanoate) and the like can be used. Further, azo polymerization initiators such as 2,2'-azobisisobutyronitrile, 2,2'-azobis(2,4-dimethylvaleronitrile), 2,2'-azobis(4-methoxy-2,4-dimethylvaleronitrile), 2,2-'azobisisobutylate, 1,1'-azobis(cyclohexane-1-carbonitrile) and 2,2'-azobis(2-amidinopropane) dihydrochloride can also be used. Furthermore, photopolymerization initiators such as benzoin methyl ether and benzoin ethyl ether can also be used.

The polymerization is carried out by injecting a solution of the monomer components containing the initiator mentioned above into a polymerization vessel of desired shape (for example, cylindrical vessel, lens shape vessel etc.) and, after sealing the vessel, initiating radical polymerization with heat or light. The above lens shape vessel is a mold having a cavity formed with molding surfaces of contact lens shape, and, when such a mold is used as the polymerization vessel, the molding cavity formed by the molding surfaces can be sealed by putting an upper mold on a lower mold. The mold may be made of, for example, resin, glass, metal or the like. However, from the viewpoints of suitable contact with the monomer, good releasability of molded products from the mold after the polymerization and ease of production in a large scale, it is desirably made of a resin. Inter alia, polypropylene, polyethylene and the like are preferred, because of their high solvent resistance and heat resistance.

In case of heat polymerization, the sealed vessel is left in a thermostat water bath with a stirrer or a hot air circulated dryer and the temperature is gradually elevated to perform the polymerization. In case of photopolymerization, monomers contained in a vessel with high transparency are irradiated by ultra-violet ray or visible light to perform the polymerization. Either in heat polymerization or photopolymerization, in order to decrease polymerization deformation, the product after the polymerization may be subjected to a heat treatment at 80 to 120° C., either after being taken out from the vessel, or along with the polymerization vessel. After the polymerization and the heat treatment, the polymerized product is cooled to room temperature to afford the 2-hydroxyethyl methacrylate polymer of the present invention.

When a lens configuration vessel (mold) is used as the above polymerization vessel, a water-containing soft contact lens of the present invention can be provided by subjecting the obtained polymer to a water-imparting treatment. When a vessel having a shape other than a lens shape, for example, a cylindrical vessel is used, the water-containing soft contact lens of the present invention can be obtained by curving the obtained polymer into a lens shape and subjecting it to a water-imparting treatment.

The above water-imparting treatment is a treatment for hydrating and swelling the polymer by immersing it into water, physiological saline, buffered physiological saline or the like, and conventional processes for this purpose can be used. The above hydration and swelling is performed until equilibrium is obtained, but time required for reaching equilibrium may vary depending on kind of the polymer. In order to promote the hydration and swelling and remove unreacted monomers from the polymer, temperature of the solution for the immersion may be maintained at 60 to 800° C. and the solution may be changed two or three times.

EXAMPLES

The present invention will be explained more specifically hereinafter with reference to the following examples.

Example 1

As a polymerization initiator, 2,2'-azobisisobutyronitrile was added in an amount of 0.05% by weight and dissolved in 2-hydroxyethyl methacrylate of high purity (purity: 99% or more). To this solution, ethylene chlorohydrin was added in an amount of 0.5% by weight with respect to the 2-hydroxyethyl methacrylate and stirred. Then, this mixture was poured into a polymerization vessel, sealed with a stopper, maintained at 46° C. for 36 hours, 46 to 60° C. for 9 hours, 60° C. for 5 hours, 60 to 80° C. for 3 hours, 80° C. for 14 hours, 80 to 100° C. for 2 hours and 100° C. for 15 hours in a hot air circulating dryer and left it to cool to room temperature to complete the polymerization.

The provided polymer was a transparent hard material. This polymer was cut and polished by machining to afford a disc having a diameter of 12 mm and a thickness of 0.2 mm. Then, it was heated in a buffered saline, whose osmotic pressure and pH resemble to those of tear, at 80° C. for 6 hours to obtain sufficiently swelled state. The swelled water-containing disc is a transparent material exhibiting gloss and a flat surface. This water-containing disc was autoclaved at 121° C. in buffered saline to evaluate its heat resistance. The results are shown in Table 1.

The evaluation was represented as follows. That is, surface condition of water-containing disc whose surface water is removed was observed by a magnifying glass of 20 times magnification, and the condition was classified into the following four grades.

A: No change is observed after the autoclaving compared to the condition before it.

B: Some changes are observed after the autoclaving. There is partial surface ununiformity.

C: Some change are observed after the autoclaving. Surface ununiformity is observed all over the surface and white clouding due to light scattering is recognized.

D: Ununiformity and white clouding are more severe than the above score C.

The disc showed the same surface condition as that observed before the autoclaving in surface observations performed after 60 minutes, 300 minutes, 600 minutes and 1200 minutes of autoclaving at 121° C. and thus it showed excellent heat resistance.

Comparative Example 1

A water-containing disc was prepared in a manner and conditions similar to those of Example 1, except that ethylene chlorohydrin was not added. The obtained water-containing disc was autoclaved as in Example 1. As a result, partial surface ununiformity was observed after 60 minutes of autoclaving. In the surface observations performed after 300 minutes, 600 minutes and 1200 minutes of the autoclaving, white clouding was observed and surface changes due to the heat were observed after 60 minutes or more of the autoclaving. The results are shown in Table 1.

Examples 2 to 4

Water-containing discs were produced in a manner and conditions similar to those of Example 1, except that the added amount of ethylene chlorohydrin was changed to 0.1% by weight (Example 2), 1.0% by weight (Example 3) or 5.0% by weight (Example 4). The obtained water-containing discs were evaluated as in Example 1. All of the water-containing discs of Examples 2 to 4 maintained the same surface conditions as those observed before autoclaving after 300 minutes of autoclaving, and thus they showed more excellent heat resistance compared to that of the comparative water-containing disc. The water-containing discs of Examples 3 and 4, which had a higher content of the additive, maintained surface condition the same as that observed before the autoclaving even after 1200 minutes of the autoclaving. The results are shown in Table 1.

It was observed that heat resistance improving effect by ethylene chlorohydrin is marked compared to Comparative Example 1 where no ethylene chlorohydrin is added, and the addition of 0.5% by weight or more brought about a remarkable effect.

Examples 5 to 7

Water-containing discs were produced in a manner and conditions similar to those of Example 1, except that carbon tetrabromide was used instead of ethylene chlorohydrin, and evaluated as in Example 1. The added amount of carbon tetrabromide was 0.1% by weight (Example 5), 0.5% by weight (Example 6) or 1.0% by weight (Example 7).

As a result, it was confirmed that addition of carbon tetrabromide exerted heat resistance improving effect.

Comparative Example 2

Ethylene chlorohydrin used in Examples 1 to 4 and carbon tetrabromide used in Example 5 to 7 exhibit chain transfer effect in radical polymerization and hence it may be considered that the heat resistance improving effect was brought along by such chain transfer effect. So, polymers were prepared in a manner and conditions similar to those of Example 1, except that dodecyl mercaptan, which is one of common mercaptan chain transfer agents, was used in an addition amount of 0.1% by weight, 0.5% by weight, 1.0% by weight or 5.0% by weight instead of ethylene chlorohydrin.

Polymers obtained by using dodecyl mercaptan showed deformation or white clouding after the water-imparting treatment when the added amount of dodecyl mercaptan was 0.5% by weight or more, and uniform and transparent hydrogel could not be obtained. A polymer added with dodecyl mercaptan in an amount of 0.1% by weight afforded a transparent water-containing disc, but it showed some changes after autoclaving of 60 minutes or more like that of Comparative Example 1, and hence it did not exhibit the heat resistance improving effect. The results are shown in Table 1.

As shown above, it was suggested that the improvement of heat resistance by addition of a halogen compound according to the present invention and not brought on by the chain transfer effect.

When a halogen compound such as ethylene chlorohydrin and carbon tetrabromide was added, more remarkable heat resistance improvement effect after autoclavirng was observed compared to when no additive was added, or when the chain transfer agent dodecyl mercaptan (non-halogen compound) was added.

TABLE 1

| | Additive | Added amount (% by weight) | Autoclaving at 121° C. (min) 60 | 300 | 600 | 1200 |
|---|---|---|---|---|---|---|
| Example 1 | Ethylene chlorohydrin | 0.5 | A | A | A | A |
| Example 2 | Ethylene chlorohydrin | 0.1 | A | A | B | B |
| Example 3 | Ethylene chlorohydrin | 1.0 | A | A | A | A |
| Example 4 | Ethylene chlorohydrin | 5.0 | A | A | A | A |
| Example 5 | Carbon tetrabromide | 0.1 | A | A | A | A |
| Example 6 | Carbon tetrabromide | 0.5 | A | A | A | A |
| Example 7 | Carbon tetrabromide | 1.0 | A | A | A | A |
| Comparative Example 1 | No additive | — | B | C | D | D |
| Comparative Example 2 | Dodecyl mercaptan | 0.1 | B | C | D | D |
| | | 0.5 | Polymer showed deformation upon water imparting | | | |
| | | 1.0 | Polymer showed white clouding | | | |
| | | 5.0 | Polymer showed white clouding | | | |

Example 8

As a polymerization initiator, 2,2'-azobisisobutyronitrile was added in an amount of 0.05% by weight to 2-hydroxyethyl methacrylate containing 0.62% by weight of ethylene chlorohydrin and dissolved. Then, this mixture was poured into a polymerization vessel, sealed with a stopper, maintained at 53° C. for 23 hours, 53 to 60° C. for 6 hours, 60° C. for 5 hours, 60 to 80° C. for 3 hours, 80° C. for 14 hours, 80 to 110° C. for 3 hours and 110° C. for 24 hours in a hot air circulating dryer and cooled from 11° C. to 40° C. over 4 hours to complete the polymerization. The obtained polymer was a transparent hard material. This polymer was cut and polished by machining into a contact lens shape.

Subsequently, the contact lens was swelled by immersing it into a treating solution comprising a colorant-aqueous mixed solvent system, which comprised 0.03 parts by weight of water-soluble vat dye blue 6, 70 parts by weight of distilled water, 30 parts by weight of ethanol, 0.5 part by weight of sodium hydrogen carbonate and 0.5 part by weight of sodium sulfite, for 75 minutes and, simultaneously the colorant penetrated into the contact lens. Then, the colorant was fixed by immersing the contact lens into a 1% by weight aqueous solution of sulfuric acid to afford a soft contact lens colored blue.

This colored contact lens was immersed in a 1% by weight aqueous solution of sodium hydrogen carbonate for 75 minutes twice, then transferred to a fresh 1% by weight aqueous solution of sodium hydrogen carbonate, heated at 80° C. for 2 hours and heated at 80° C. for 2 hours in a buffered saline twice to afford a water-containing soft contact lens colored blue.

Figure 2:
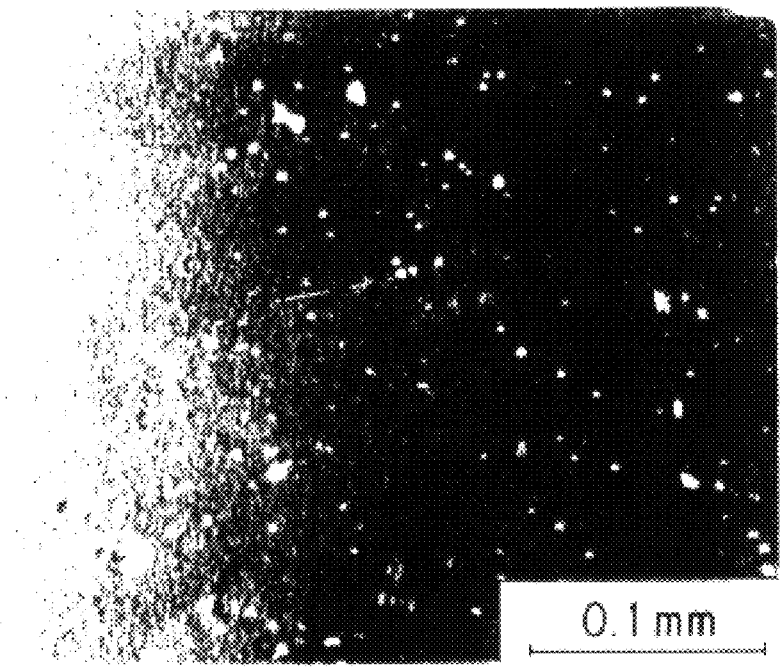
FIG. 2 is a differential interference microscopic photograph of a surface of a contact lens having undergone 360 times of boiling sterilization by a boiling sterilizer.

The surface of the obtained soft contact lens was flat and had gloss. This soft contact lens was put into a commercially available lens container with buffered saline and repeatedly subjected to boiling sterilization by a boiling sterilizer for soft contact lenses to evaluate its heat resistance in a manner similar to that of Example 1. A magnified photograph and a differential interference microscopic photograph of surface of the contact lens after 360 times of boiling sterilization are shown as. FIGS. 1 and 2.

Simultaneously, several parameters of the lens (base curve [BC], diameter [Dia] and power) were determined. Its visible light transmission at 380 to 780 nm was measured in a buffered saline by a recording spectrophotometer and an average transmission in that wavelength range was calculated. The results are shown in Table 2.

The parameters of lens, visible light transmission and surface condition were not significantly changed after 1090 times of the boiling treatment compared to those observed before starting the boiling treatment and hence they exhibited excellent heat resistance.

Comparative Example 3

A water-containing soft contact lens colored blue was prepared from 2-hydroxyethyl methacrylate of high purity (purity: 99% or more) by a method and conditions the same as those of Example 8 and similarly subjected to the boiling treatment. This soft contact lens which had been made from 2-hydroxyethyl methacrylate of high purity and not containing ethylene chlorohydrin, showed some changes of surface condition after 90 times of the boiling treatment.

Figure 3:
FIG. 3 is a photograph showing a magnified surface of contact lens undergone 360 times of boiling sterilization by a boiling sterilizer.
Figure 4:
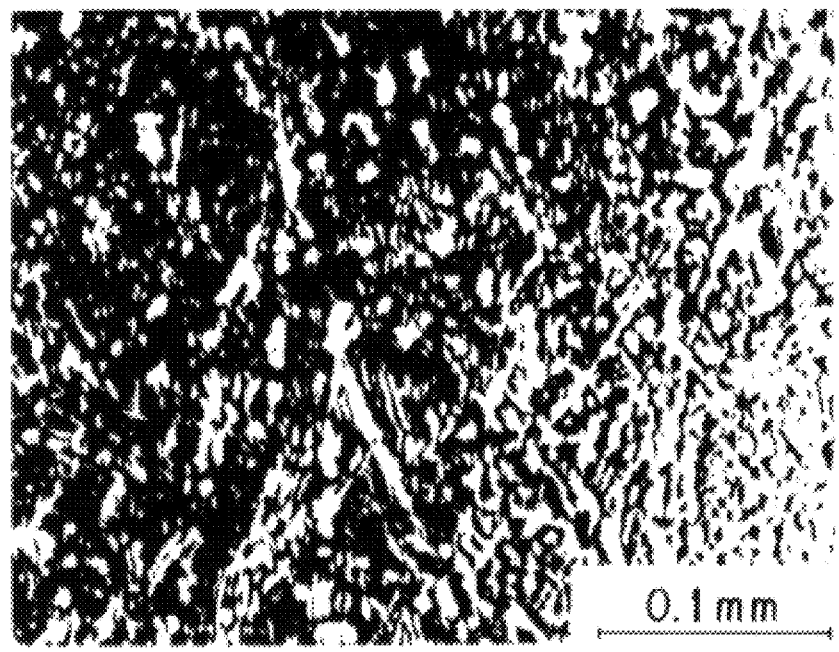
FIG. 4 is a differential interference microscopic photograph of surface of contact lens undergone 360 times of boiling sterilization by a boiling sterilizer.

A magnified photograph and a differential interference microscopic photograph of surface of this contact lens after 360 times of boiling sterilization are shown as. FIGS. 3 and 4. White clouding due to light scattering caused by ununiformity of the surface was observed. Though no changes of base curve and diameter of the lens were observed, light transmission was changed after 90 times of the boiling treatment. The power could not be measured after 760 times of the treatment, because resolution became too bad to measure the power. The results are shown in Table 2.

From the results shown in Table 2, it is confirmed that the lens of Example 8 that used a halogen compound is excellent in heat resistance.

TABLE 2

| Repeated times of boiling treatment | Evaluated item | | Example 8 | Comparative Example 3 |
|---|---|---|---|---|
| 0 (before treatment) | Parameter | BC (mm) | 8.7 | 8.7 |
| | | Dia (mm) | 13.8 | 13.4 |
| | | Power (D) | −2.75 | −3.00 |
| | % T *(380 to 780 nm) | | 96.6 | 95.2 |
| | Surface condition | | A | A |
| 90 | Parameter | BC (mm) | 8.7 | 8.7 |
| | | Dia (mm) | 13.8 | 13.4 |
| | | Power (D) | −2.75 | −3.00 |
| | % T *(380 to 780 nm) | | Less than 1% | −1.5% |
| | Surface condition | | A | C |
| 360 | Parameter | BC (mm) | 8.7 | 8.7 |
| | | Dia (mm) | 13.8 | 13.4 |
| | | Power (D) | −2.75 | −3.00 |
| | % T *(380 to 780 nm) | | Less than 1% | −2.4% |
| | Surface condition | | A | D |
| 760 | Parameter | BC (mm) | 8.7 | 8.7 |
| | | Dia (mm) | 13.8 | 13.4 |
| | | Power (D) | −2.75 | Measurement was impossible. |
| | % T *(380 to 780 nm) | | Less than 1% | −3.0% |
| | Surface condition | | A | D |
| 1090 | Parameter | BC (mm) | 8.7 | 8.7 |
| | | Dia (mm) | 13.8 | 13.4 |
| | | Power (D) | Less than 1% | Measurement was impossible. |
| | % T *(380 to 780 nm) | | Less than 1% | −3.6% |
| | Surface condition | | A | D |

% T: Light transmission,
% T*: Difference of light transmission between before and after the treatment.

Example 9

A monomer solution having a comonomer composition of 86.3% by weight of 2-hydroxyethyl methacrylate of high purity (purity: 99% or more), 10.0% by weight of methyl methacrylate, 3.0% by weight of n-butyl methacrylate and 0.3% by weight of methacrylic acid was prepared by mixing these monomers. To this monomer solution, 0.4% by weight of bis-(4-t-butylcyclohexyl)peroxydicarbonate (polymerization initiator) was added and dissolved to afford a monomer solution A. Further, a monomer solution B was prepared by adding 1% by weight of carbon tetrachloride as a halogen compound to the monomer solution A.

An appropriate amount of the monomer solution B was injected into a pair of molds (combination of convex mold and concave mold) for contact lens made of polypropylene and polymerized by heating in a hot air dryer. The molds were separated and a polymer in a contact lens shape was taken out from the molds. The obtained polymer was hard. Then, the polymer was subjected to a coloration treatment and water-imparting treatment as in Example 8.

A water-containing soft contact lens obtained after the water-imparting treatment was excellent in transparency and showed uniform coloration. The results are shown in Table 3.

Comparative Example 4

Using the monomer solution A of Example 9, polymerization in molds, coloration and water-imparting treatment were performed as in Example 9.

The water-containing soft contact lens obtained after the water-imparting treatment showed white clouding due to light scattering when it was immersed into water and irradiated by light from a halogen lamp. The results are shown in Table 3.

Examples 10 to 13

To the monomer solution A of Example 9, 1% by weight of chloroform, carbon tetrabromide, dichloromethane or trichloroethane was added as a halogen compound to afford monomer solutions B. Using these monomer solutions B, polymerization in molds and coloration and water-imparting treatment were performed as in Example 9.

All of the water-containing soft contact lenses obtained after the water-imparting treatment were excellent in transparency and showed uniform coloration. The results are shown in Table 3.

Comparative Example 5

Five % by weight of water was added to the monomer solution A of Example 9 to afford a monomer solution B. Using this monomer solution B, polymerization in molds and coloration and water-imparting treatment were performed as in Example 9.

The water-containing soft contact lens obtained after the water-imparting treatment was white, cloudy and not transparent. The results are shown in Table 3.

Comparative Examples 6 and 7

5% by weight of ethanol or n-hexane was added to the monomer solution A of Example 9 to afford monomer solutions B. Using these monomer solutions B, polymerization in molds and coloration and water-imparting treatment were performed as in Example 9. The water-containing soft contact lenses obtained after the water-imparting treatment were white, cloudy and not transparent. The results are shown in Table 3.

TABLE 3

| | Additive | Added amount (wt %) | Transparency of water-containing SFC* |
|---|---|---|---|
| Example 9 | Carbon tetrachloride | 1 | Good transparency, uniform coloration |
| Example 10 | Chloroform | 1 | Good transparency, uniform coloration |
| Example 11 | Carbon tetrabromide | 1 | Good transparency, uniform coloration |
| Example 12 | Dichloromethane | 1 | Good transparency, uniform coloration |
| Example 13 | Trichloroethane | 1 | Good transparency, uniform coloration |
| Comparative Example 4 | No additive | 0 | Clouding in water due to light scattering, ununiform coloration |
| Comparative Example 5 | Water | 5 | White clouding |
| Comparative Example 6 | Ethanol | 5 | White clouding or not transparent |
| Comparative Example 7 | n-Hexane | 1 | White clouding or not transparent |

*Water-containing SFC: Water-containing soft contact lens

As demonstrated by the results of Examples 9 to 13 and Comparative Examples 4 to 7 shown in Table 3, the water-containing soft contact lenses obtained from HEMA copolymers containing a halogen compound and polymerized in molds exhibited more excellent transparency compared with that obtained with no additive. Further, transparency is clearly improved compared with those obtained by using a solvent mentioned in the prior art such as ethanol or n-hexane.

Example 14

Thirty sets of molds for contact lens made of polypropylene (combination of convex mold and concave mold) were immersed in 1 liter of chloroform for 64 hours, taken out from the chloroform and dried in air. Then, the molds were dried in a hot air dryer at 50° C. for 4 hours. A suitable amount of the monomer solution A of Example 9 were injected into the dried molds and polymerized by heating in a hot air dryer.

The molds were separated and polymerization products of contact lens shape were taken out from the molds, and the products were subjected to a coloration treatment and a water-imparting treatment in a manner similar to that of Example 8.

All of the water-containing soft contact lenses obtained after the water-imparting treatment were excellent in transparency and exhibited uniform coloration. The results are shown in Table 4.

Comparative Example 8

A water-containing soft contact lens was produced in a manner similar to that of Example 14, except that N-hexane was used as an immersion solution instead of chloroform. The obtained lens showed white clouding in water due to light scattering. The results are shown in Table 4.

As shown by Comparative Example 8, a water-containing soft contact lens with clouding was obtained when the molds were treated with a solvent of non-halogen compound. Contrary to this, when the molds were treated with a halogen compound as in Example 14, a water-containing soft contact lens exhibiting good transparency and uniform coloration was obtained.

TABLE 4

| | Solvent for treating molds | Transparency of water-containing soft contact lens |
|---|---|---|
| Example 14 | Chloroform | Good transparency, uniform coloration |
| Comparative Example 8 | n-Hexane | Clouding in water due to light scattering |

As explained above, according to the production methods of the present invention, hydrogels and water-containing soft contact lenses with improved heat resistance can be obtained by polymerizing HEMA monomers or comonomers mainly composed of HEMA added with or containing a halogen compound. In addition, when the polymerization is performed in molds for contact lenses, transparency of water-containing soft contact lenses is also improved by adding a small amount of the additive and ununiformity such as ununiform coloration is eliminated. Furthermore, transparency of the lenses is improved and ununiformity such as ununiform coloration is eliminated by treating molds for contact lens themselves with a specific halogen compound.

As demonstrated by the comparative examples, the present invention provides the advantages, which cannot be obtained by the additives described in the prior art, with a small amount of the halogen compound.

What is claimed is:

1. A method for producing 2-hydroxyethyl methacrylate based polymers comprising radical polymerization of 2-hydroxyethyl methacrylate or a monomer mixture comprising mainly 2-hydroxyethyl methacrylate in the presence of an inert chlorinated or brominated compound.

2. A method of claim 1 wherein the halogen compound is a halogen-containing organic compound.

3. A method of claim 2 wherein the halogen-containing organic compound is a hydrocarbon compound containing 1 to 4 carbon atoms and one or more chlorine or bromine atoms.

4. A method of claim 3 wherein the hydrocarbon compound is selected from the group consisting of ethylene chlorohydrin, carbon tetrabromide, carbon tetrachloride, chloroform, dichloromethane and trichloroethane.

5. A method of claim 1 wherein content of the halogen compound ranges from 0.05 to 6% by weight.

6. A method of claim 1 wherein the 2-hydroxyethyl methacrylate or the monomer mixture contains a radical polymerization initiator.

7. A method of claim 1 wherein the 2-hydroxyethyl methacrylate has a purity of 96% or more.

8. A method for producing 2-hydroxyethyl methacrylate based polymers wherein a chlorinated or brominated compound is added to 2-hydroxyethyl methacrylate or to the monomer mixture mainly comprising 2-hydroxyethyl methacrylate, and then a resultant mixture is subjected to radical polymerization.

9. A method of claim 8 wherein the halogen compound is a halogen-containing organic compound.

10. A method of claim 9 wherein the halogen-containing organic compound is a hydrocarbon compound containing 1 to 4 carbon atoms and one or more chlorine or bromine atoms.

11. A method of claim 10 wherein the hydrocarbon compound is selected from the group consisting of ethylene chlorohydrin, carbon tetrabromide, carbon tetrachloride, chloroform, dichloromethane and trichloroethane.

12. A method of claim 8 wherein content of the halogen compound ranges from 0.05 to 6% by weight.

13. A method of claim 8 wherein the 2-hydroxyethyl methacrylate or the monomer mixture contains a radical polymerization initiator.

14. A method of claim 8 wherein the 2-hydroxyethyl methacrylate has a purity of 96% or more.

15. A method for producing 2-hydroxyethyl methacrylate based hydrogels wherein a 2-hydroxyethyl methacrylate polymer obtained by the method of claim 1 is subjected to a water-imparting treatment.

16. A method for producing 2-hydroxyethyl methacrylate based hydrogels wherein a 2-hydroxyethyl methacrylate polymer obtained by the method of claim 2 is subjected to a water-imparting treatment.

17. A method of claim 15 wherein the halogen compound is a halogen-containing organic compound.

18. A method of claim 17 wherein the halogen-containing organic compound is a hydrocarbon compound containing 1 to 4 carbon atoms and one or more chlorine or bromine atoms.

19. A method of claim 18 wherein the hydrocarbon compound is selected from the group consisting of ethylene chlorohydrin, carbon tetrabromide, carbon tetrachloride, chloroform, dichloromethane and trichloroethane.

20. A method of claim 15 or wherein content of the halogen compound ranges from 0.05 to 6% by weight.

21. A method of claim 15 or wherein the 2-hydroxyethyl methacrylate or the monomer mixture contains a radical polymerization initiator.

22. A method of claim 15 or wherein the 2-hydroxyethyl methacrylate has a purity of 96% or more.

23. A method for producing water-containing soft contact lenses wherein a 2-hydroxyethyl methacrylate polymer obtained by the method of claim 1 is molded into a shape of contact lens and subjected to a water-imparting treatment.

24. A method for producing water-containing soft contact lenses wherein a 2-hydroxyethyl methacrylate polymer obtained by the method of claim 2 is molded into a shape of contact lens and subjected to a water-imparting treatment.

25. A method of claim 23 or wherein the halogen compound is a halogen-containing organic compound.

26. A method of claim 25 wherein the halogen-containing organic compound is a hydrocarbon compound containing 1 to 4 carbon atoms and one or more chlorine or bromine atoms.

27. A method of claim 26 wherein the hydrocarbon compound is selected from the group consisting of ethylene chlorohydrin, carbon tetrabromide, carbon tetrachloride, chloroform, dichloromethane and trichloroethane.

28. A method of claim 23 or wherein content of the halogen compound ranges from 0.05 to 6% by weight.

29. A method of claim 23 or wherein the 2-hydroxyethyl methacrylate or the monomer mixture contains a radical polymerization initiator.

30. A method of claim 23 wherein the 2-hydroxyethyl methacrylate has a purity of 96% or more.

31. A method for producing 2-hydroxyethyl based polymers in a lens-shaped mold having a molding surface comprising treating the molding surface with an inert halogen compound, radically polymerizing 2-hydroxyethyl methacrylate, or a monomer mixture mainly comprising hydroxyethyl methacrylate, in the mold.

32. A method of claim 31 wherein 2-hydroxyethyl methacrylate or a monomer mixture mainly composed of 2-hydroxyethyl methacrylate contains a halogen compound.

33. A method of claim 31 or wherein the halogen compound is a halogen-containing organic compound.

34. A method of claim 33 wherein the halogen-containing organic compound is a hydrocarbon compound containing 1 to 4 carbon atoms and one or more chlorine or bromine atoms.

35. A method of claim 34 wherein the hydrocarbon compound is selected from the group consisting of ethylene chlorohydrin, carbon tetrabromide, carbon tetrachloride, chloroform, dichloromethane and trichloroethane.

36. A method of claim 32 wherein content of the halogen compound ranges from 0.05 to 6% by weight.

37. A method of claim 31 wherein the 2-hydroxyethyl methacrylate or the monomer mixture contains a radical polymerization initiator.

38. A method of claim 31 wherein the 2-hydroxyethyl methacrylate has a purity of 96% or more.

39. A method for producing water-containing soft contact lenses wherein a 2-hydroxyethyl methacrylate polymer obtained by the method of claim 31 is subjected to a water-imparting treatment.

40. A method for producing water-containing soft contact lenses wherein a 2-hydroxyethyl methacrylate polymer obtained by the method of claim 32 is subjected to a water-imparting treatment.

41. A method of claim 39 wherein the halogen compound is a halogen-containing organic compound.

42. A method of claim 41 wherein the halogen-containing organic compound is a hydrocarbon compound containing 1 to 4 carbon atoms and one or more chlorine or bromine atoms.

43. A method of claim 42 wherein the hydrocarbon compound is selected from the group consisting of ethylene chlorohydrin, carbon tetrabromide, carbon tetrachloride, chloroform, dichloromethane and trichloroethane.

44. A method of claim 39 wherein content of the halogen compound ranges from 0.05 to 6% by weight.

45. A method of claims 39 wherein the 2-hydroxyethyl methacrylate or the monomer mixture contains a radical polymerization initiator.

46. A method of claim 16 wherein the halogen compound is a halogen-containing organic compound.

47. A method of claim 16 wherein content of the halogen compound ranges from 0.05 to 6% by weight.

48. A method of claim 16 wherein the 2-hydroxyethyl methacrylate or the monomer mixture contains a radical polymerization initiator.

49. A method of claim 16 wherein the 2-hydroxyethyl methacrylate has a purity of 96% or more.

50. A method of claim 24 wherein the halogen compound is a halogen-containing organic compound.

51. A method of claim 24 wherein content of the halogen compound ranges from 0.05 to 6% by weight.

52. A method of claim 24 wherein the 2-hydroxyethyl methacrylate or the monomer mixture contains a radical polymerization initiator.

53. A method of claim 24 wherein the 2-hydroxyethyl methacrylate has a purity of 96% or more.

54. A method of claim 32 wherein the halogen compound is a halogen-containing organic compound.

55. A method of claim 32 wherein the 2-hydroxyethyl methacrylate or the monomer mixture contains a radical polymerization initiator.

56. A method of claim 32 wherein the 2-hydroxyethyl methacrylate has a purity of 96% or more.

57. A method of claim 40 wherein the halogen compound is a halogen-containing organic compound.

58. A method of claim 40 wherein content of the halogen compound ranges from 0.05 to 6% by weight.

59. A method of claim 40 wherein the 2-hydroxyethyl methacrylate or the monomer mixture contains a radical polymerization initiator.

* * * * *